United States Patent [19]

Davitian

[11] E Re. 30,656

[45] Reissued Jun. 30, 1981

[54] WEAVING SYSTEM, METHOD OF WEAVING AND APPARATUS

[76] Inventor: Edward Davitian, 420 E. 55th St., New York, N.Y. 10022

[21] Appl. No.: 967,718

[22] Filed: Dec. 8, 1978

Related U.S. Patent Documents

Reissue of:

[64] Patent No.: 4,109,355
Issued: Aug. 29, 1978
Appl. No.: 765,796
Filed: Feb. 4, 1977

[51] Int. Cl.[3] ..... D03D 29/00
[52] U.S. Cl. ..... 28/151
[58] Field of Search ..... 28/149, 151, 152, 150

[56] References Cited

U.S. PATENT DOCUMENTS

| | | | |
|---|---|---|---|
| 798,559 | 8/1905 | Bartlett | 28/151 |
| 2,065,498 | 12/1936 | Bacheller | 28/151 |
| 3,739,437 | 6/1973 | Alberici | 28/151 |
| 3,748,706 | 7/1973 | Doyel | 28/150 |

FOREIGN PATENT DOCUMENTS

| | | | |
|---|---|---|---|
| 1003305 | 1/1977 | Canada | 28/151 |

*Primary Examiner*—Louis Rimrodt
*Attorney, Agent, or Firm*—Nims, Howes, Collison & Isner

[57] ABSTRACT

An improved weaving system, method of weaving and apparatus therefor for facilitating individually manipulable single fiber fabrication of woven fabrics.

11 Claims, 18 Drawing Figures

WEAVING SYSTEM, METHOD OF WEAVING AND APPARATUS

Matter enclosed in heavy brackets [ ] appears in the original patent but forms no part of this reissue specification; matter printed in italics indicates the additions made by reissue.

This invention relates to an improved weaving system, method of weaving and apparatus therefor and particularly to an improved construction for a portable and easily manipulable weaving assembly for hobbyists, home use and the like that facilitates the individualized making of woven articles of widely variable selective patterning in a rapid and single manner.

Fabric formation by weaving, knitting, crocheting and the like are among mankind's oldest arts. At the present time, hobbyists, home use or other individualized employment of the basic techniques almost exclusively involves knitting and crocheting as distinguished from weaving because of the nature of the basic equipment required for the latter. While the art has suggested varying types of apparatus adjuncts to speed up or otherwise facilitate individualized knitting or crocheting as, for example, multiple needle holding frames for positioning yarns or other fibers in a manner so as to be receivable by a second component such as a sinker, hook and needle, there has been a pronounced dearth of individually utilizable apparatus adjuncts for individualized and simplified weaving operations.

This invention may be briefly described as an improved weaving system incorporating, in its broad aspects, a simplified method of weaving and apparatus adapted to facilitate individualized utilization of the method in the making of woven articles of widely variable selective patterning in a rapid and simple manner. In its narrower method aspects the subject invention includes the utilization of stationary or selectively displaceable contiguous double warp fibers in association with one or more universally displaceable weft fibers. In its narrower apparatus aspects, the invention includes a holding frame having a multiplicity of elongate warp fiber positioning rods terminally mounted in predetermined spaced relation thereon to permit the individualized disposition of the weft fiber, as fed through a hollow wand, in interengaged relation thereto in accord with the dictates of the user.

Among the advantages of the subject invention is the provision of a simplified weaving system that facilitates individualized weaving operations in a facile manner with easily manipulable and small, readily portable apparatus adjuncts. Still other advantages include the permitted use of simple, inexpensive and easily fabricated equipment of readily portable character for individualized weaving operations for home use by hobbyists and the like.

One object of this invention is the provision of a simple weaving system.

Another object of this invention is the provision of a method and apparatus for the individualized making of woven articles in a rapid and simple manner.

Another object of this invention is the provision of a simple weaving assembly for the individualized fabrication of selectively designed woven articles by hobbyists and the like.

A further object of this invention is the provision of a simple, inexpensive and easily manipulable weaving assembly for the individualized fabrication of selectively patterned woven articles.

Other objects and advantages of the subject invention will become apparent from the following portions of this specification and from the appended drawings which illustrate in accord with the mandates of the patent statutes, presently preferred constructions illustrative of an incorporating the principles of this invention.

Referring to the drawing.

As is well known, fabric, whether woven, knitted, crocheted of the like, can be formed of many different filamentous materials. The term "fiber" will be generally employed herein to delineate any elongate material of filamentous character, i.e. being of extremely diminutive cross section relative to its length, such as yarns formed of wool or synthetic filamentous material, thread, mono-filaments and the like of any type or kind and from which articles can be woven in accord with the method described herein.

Figure 1:
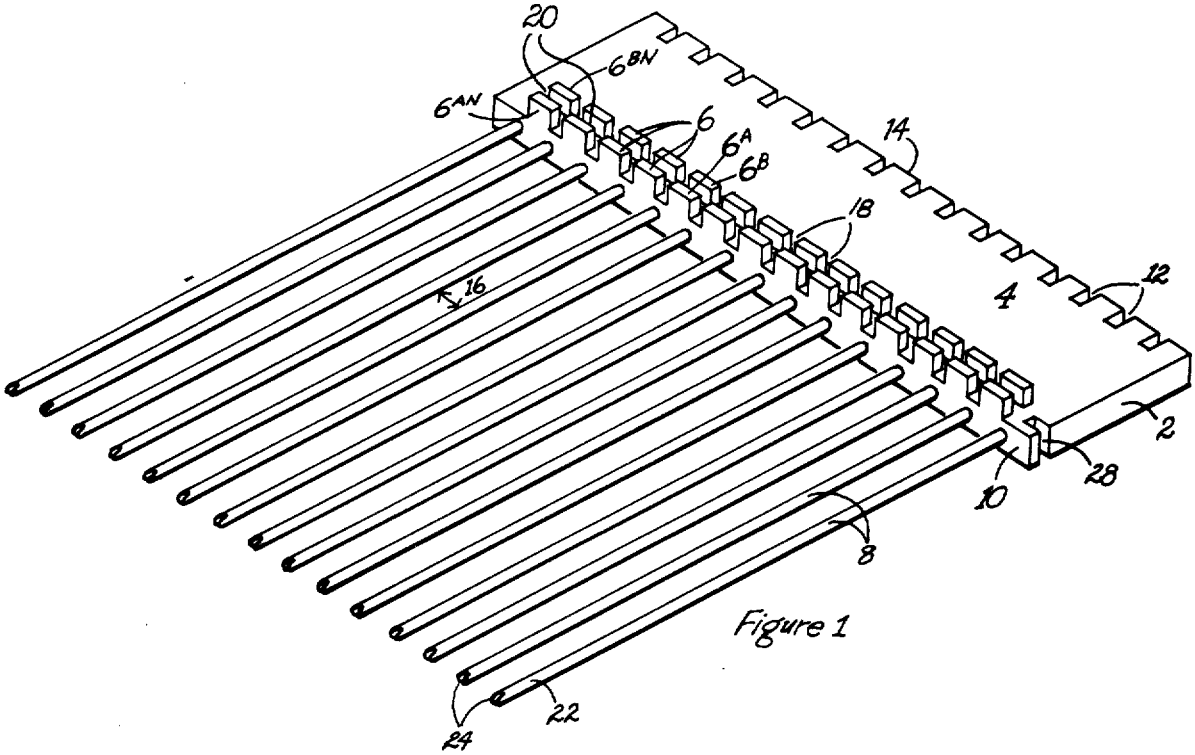
FIG. 1 is an oblique view of a holding frame assembly incorporating the principles of this invention.

Referring initially to FIG. 1 there is provided a holding frame assembly 2 comprising a generally rectangular planar base portion 4 suitably formed of synthetic resinous material, wood, metal or other rigid stock. Although a unitary structure is shown, such base portion may be compositely formed of foldable segments to facilitate compact carrying thereof in association with suitable fastening means to releasably lock the foldable segments thereof in substantially coplanar relation when in use. Terminally mounted in and extending outwardly from one of the marginal edges 10 are a plurality of relatively rigid small diameter elongate rods 8 suitably constituted of metal, synthetic resinous material, wood, or other rigid stock of suitable strength. As illustrated, the rods 8 are disposed in parallel spaced relation with each other, may be solid or hollow, and may be permanently or removably mounted in the base section to form a comb-like frame assembly. The free end 22 of each of the rods 8 contains a notch 24 sized to receive and accomodate the fiber being employed for the weaving operation. The rods 8 are preferably uniformly spaced relative to each other for uniformity of weave, but such spacing can be of non-uniform character if desired, for particular effects.

Extending upwardly from the surface of the planar body portion 4 and disposed adjacent to the marginal edge 10 thereof are a plurality of spaced lugs or rectangular posts 6, preferably arranged in pairs 6a, 6b so as to compositely form an elongate transverse slot 20 therebetween. Such slot 20, as defined both by the height of the lugs 6 and the spacing therebetween, should be such as to readily accommodate and contain the fiber being employed for the weaving operation. As illustrated, the posts or lugs 6 are preferably of a length sufficient to substantially traverse the spacing 16 between the rods 8, and are spaced apart a distance 18 that at least approximates the diameter of the rods 8 being employed. Notches 28 are provided in the transverse marginal edges coaxial with the transverse slot 20. Placement of the notch as shown in the drawings herein is intended to be illustrative and not a limitation as to the number and positional placement of said notch.

The remotely disposed and parallel marginal edge 14 of the base portion 4 may include a plurality of slots 12 disposed in coaxially aligned relation with the rods 8. As will become apparent hereinafter, such slots 12 can contribute materially to prevention of entangling of multiple warp fibers and (when employed) facilitate the addition of new warp fibers to a weave already in progress. The dimensions of the slots 12 should be such as to allow the unimpeded flow of the warp fiber therethrough, absent the presence of a displacement limiting knot therein.

As will be apparent, the above disclosed construction for the holding frame assembly is of such character as to permit its molding as a unitary structure from synthetic resinous materials or can be compositely assembled from individually formed and shaped components.

Figure 2:
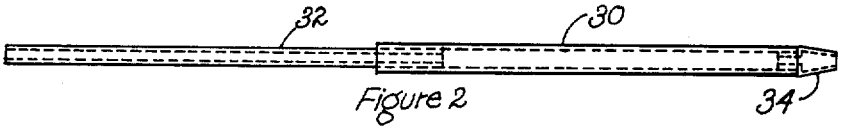
FIG. 2 is a side elevation of a fiber feed wand.

FIG. 2 illustrates a presently preferred construction for a feed wand 30 for the weft fiber. As there shown, such wand 30 comprises an elongate hollow tube 32 which can be of unitary construction or compositely formed of releasably joinable sections. Removably mounted at one end thereof is a conically shaped head or cap 34 having a bore adjustably sized to frictionally engage the fiber being employed for weaving. In the illustrated construction, the fiber passes throughout the length of the tube 32 and issues from the cap 34. Alternatively, a solid rod having an eye or fiber encircling loop at its terminal end may be employed. The feed wand may be threaded with fiber by means of a fine wire hook of the like.

Figure 3:
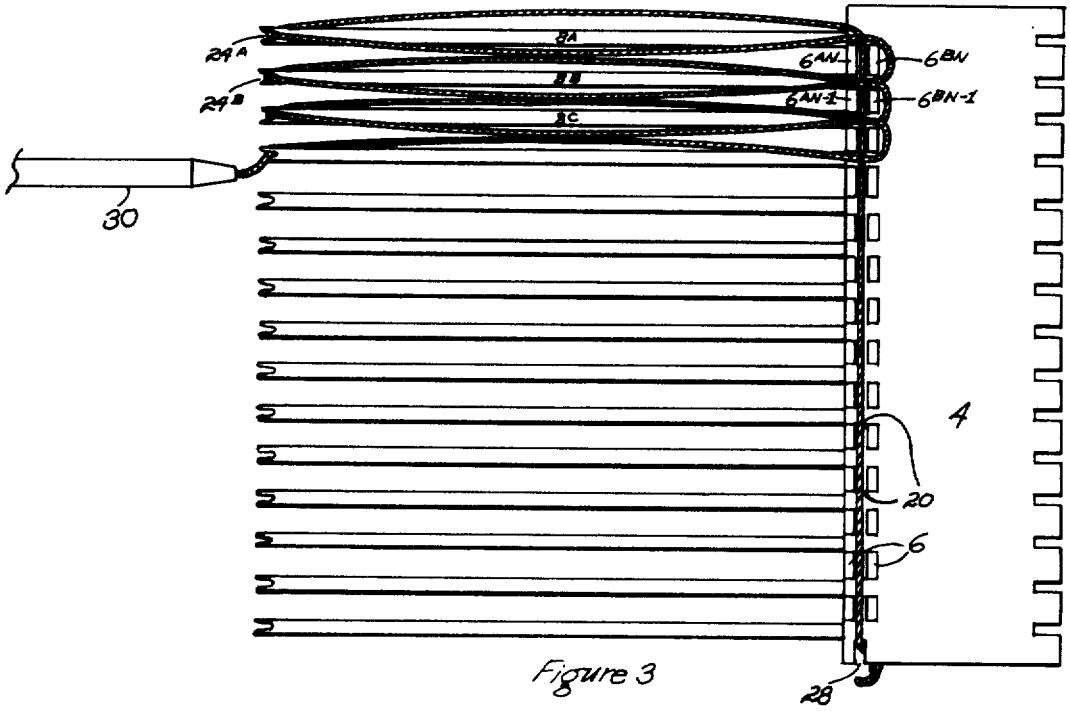
FIG. 3 is a plan view of the holding frame assembly of FIG. 1 illustrating the initial threading of a warp fiber thereon.

In the use of the described apparatus, one end of the fiber to be employed is threaded through the feed wand 32 and a knot formed in the free end extending from the cap 34. As shown in FIG. 3, the knotted end is inserted into the notch 28 and the wand manipulated so as to deposit the fiber across the base 4 within the transverse slot 20 formed by the pairs of lugs 6, until it passes through the last set of lugs 6An and 6Bn. The wand is then manipulated to position the fiber along rod 8A under notch 24a at the free end thereof and then back along rod 8A, past lug 6An and around lug 6Bn, back alongside of rod 8B, under the notch 24B at the free end thereof, back along rod 8B past lug 6An—1, around lug 6Bn—1, back alongside of rod 8C and so forth. The sequence of wand movements and fiber dispensement continues until the rod 8 nearest the starting point, i.e.—notch 28 has the two lengths of warp fiber mounted thereon.

As a weave pattern dictates, one or more rods 8 can be skipped in the threading of the holding frame with the warp fibers.

Figure 4:
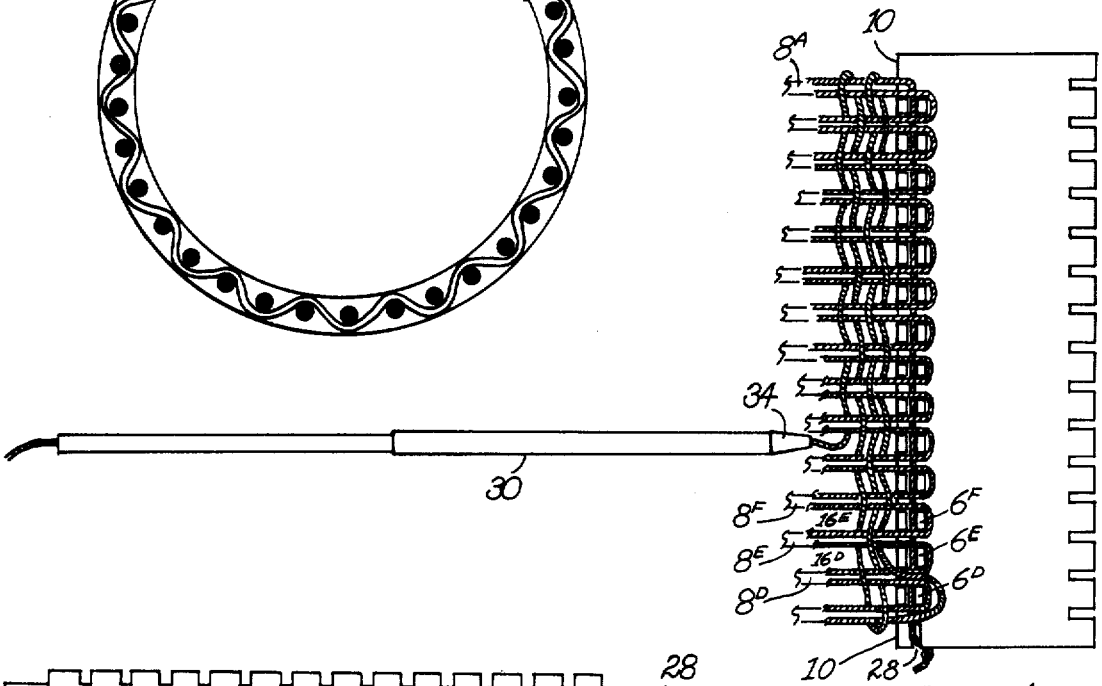
FIG. 4 is a plan view of the holding frame assembly of FIG. 1 partially cut away and schematically illustrating one series of permitted manipulative displacements of the feed wand in forming a weave.
Figure 5:
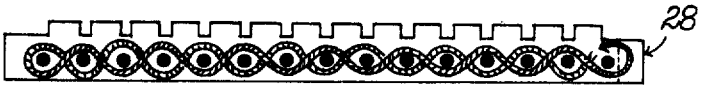
FIG. 5 is a schematic sectional view illustrative of one permitted mode of feed wand displacement to form a woven fabric.

FIGS. 4 and 5 schematically illustrate a basic path of wand displacement to deposit weft fibers in interleased relation with the previously deposited warp fibers. With the feed tube (30) positioned parallel to the rods' length and with cap 34 located adjacent to edge 10, the feed wand (30) is manipulated counterclockwise around the exterior perimeter of lug 6D, then over rod 8D through adjacent space 16D, down under rod 8E, up through space 16E and continuing in said over and under sequence until rod 8A is reached. Direction of weft fiber deposition is then reversed to place the weft fiber in alternating over and under relation with the previously deposited traverse thereof. Repeated deposition of weft fiber may continue until the length of the rods 8 is fully encompassed with fiber.

To release the weave from the apparatus, the warp fiber loops disposed around the exterior perimeter of the lugs 6 are disengaged by removing the end of the fiber from notch 28, which upon further lifting moves upwardly and out of slot 20 and sequentially disengages the warp loops from the posts. The length of fiber previously disposed in slot 20 may now be threaded back through the warp fiber loop to secure the end of the weave.

*The above describes a preferred embodiment where a double row of lugs 6 is used to facilitate the easy removal of the completed weave from the apparatus. However, it should be understood that this easy removal feature may also be accomplished with a single row of lugs. Thus, the double row of lugs is not critical to the practice of this invention. In this alternate embodiment, the fiber is knotted at one end and inserted in notch 28 as before. Here, however, the fiber is then next disposed in front of the single row of lugs 6 (that is on the side adjacent the rods 8) across the base 4 to the last lug 6An. The fiber is then disposed around the back side of lug 6An and then down rod 8A to terminal notch 24A. The weaving on the apparatus is then continued as before to complete the weave. Once the weave is completed, the weave may be removed by again grasping the end of the fiber in notch 28 and lifting the fiber upwardly as in the preferred embodiment.*

The woven fabric is then displaced as an entity longitudinally of the rods 8. The initial displacement thereof will operate to remove the terminal loops in the warp fibers from the terminal notches 24. Passage of the end of the weft fiber through such now exposed loops will lock the edge and prevent unraveling thereof.

After removal of the weave from the holding assembly, a new fabric section may be made in the manner described above. Composite fabrics made up of pluralities of individually woven sections are readily assembly and interconnected.

Figures 6A, 6B, 6C, 6D, 6E, 6F, 6G, 6H, 6I, 6J, 6K, 6L:
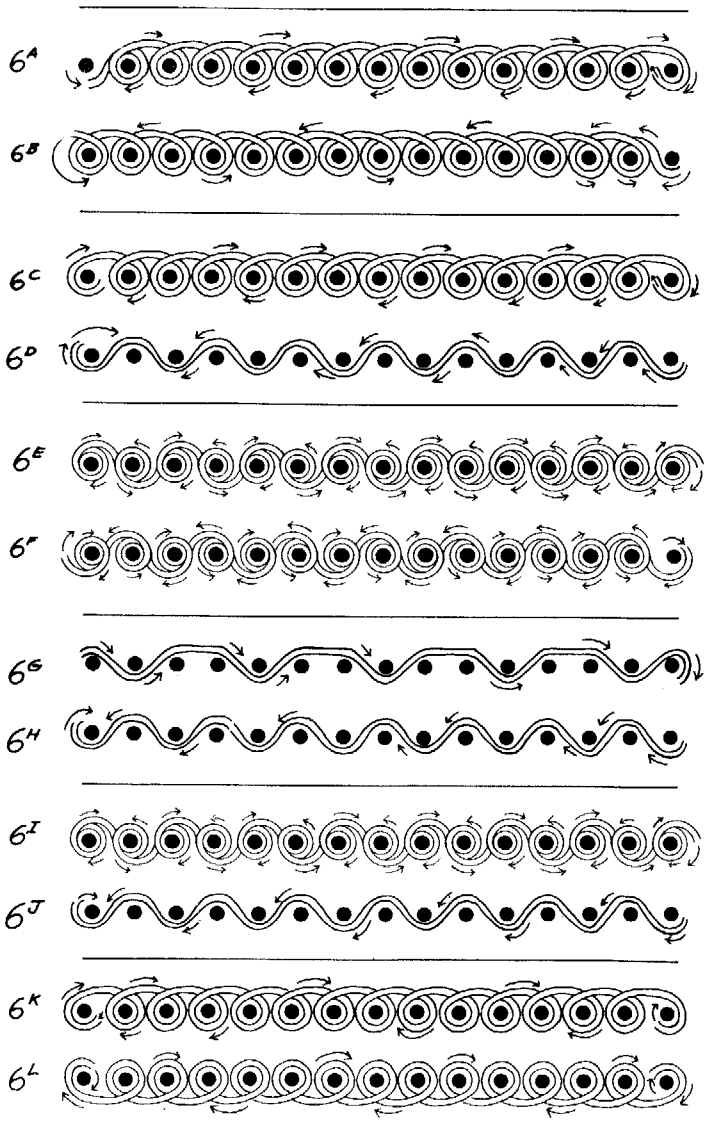
FIGS. 6A through 6L are schematic sectional views illustrative of other modes of permitted wand displacement.

FIGS. 6A through 6L schematically illustrate various paths of feed wand displacement to provide different weaves and patterns. FIG. 6A illustrates a segment of the chain stitch stretch weave formed by the left to right feed wand (30) transverse path with accompanied weft fiber displacement in repetitive clockwise rotation. FIG. 6B illustrates a second segment or right to left wand (30) transverse path with accompanied weft fiber displacement in repetitive counterclockwise rotation. The combination of 6A and 6B form a stretch stitch which is similar in resemblance to a knitting stitch. FIGS. 6C and 6D are the weft fiber displacement paths which form the chain stitch semi-stretch weave which is also similar in resemblance to a knitting stitch. FIG. 6C is a repetition of FIG. 6A. FIG. 6D depicts a weft fiber displacement path formed by the feed wand (30) right to left transverse path under one rod and over the adjacent rod sequentially FIGS. 6E and 6F combined illustrate the two segments which result in the chain stitch stretch weave analogous respectively to FIGS.

Figure 7:
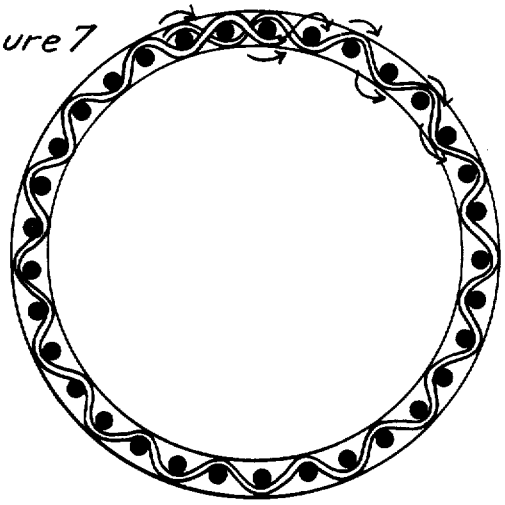
FIG. 7 is a schematic representation of a holding frame assembly of circular configuration incorporating the principles of the invention.

6A and 6B except that the fiber cross over between adjacent rods is depicted in the plane containing said rods rather than in a plane above said rods as shown in FIGS. 6A and 6B. 6E and 6F together produces a rather high stretch weave that appears the same on both sides of woven fabric. FIGS. 6G and 6H combined merely illustrate one of the many variations in stitch weave possible by different combinations of skipped rods in the sequential under and over path. The combination of 6I and 6J together with the combination of 6K and 6L will further illustrate the many additional variations of stretch and semi-stretch patterns that can be formed by this method of weaving. As can readily be seen, the illustrated paths of feed wand displacement (as well as numerous additional variations not illustrated herein) can be combined to produce an infinite number of variations. FIG. 7 depicts only one several handle assembly configuration variations. As shown, the holding frame can be of unitary circular configuration or of a circular base portion compositely formed of foldable segments releasably joined by appropriate fastening means (not shown). In this configuration the rods 8 therein must be of uneven number in order to permit uniform weft fiber displacement thereon as the feed wand 30 is manipulated around and through adjacent coplanar rods.

Having thus described my invention, I claim:

1. Weaving apparatus for individually manipulable single fiber fabrication of woven fabrics comprising:

a weaving holding frame having a plate like base portion having first and second spaced marginal edges, a first row of longitudinally spaced lugs extending above the surface of said base portion adjacent said first marginal edge thereof, a second rod of longitudinally spaced lugs extending above the surface of said base portion disposed in adjacent spaced relation to said first row of lugs to define fiber receiving channel therebetween, and a plurality of elongate rod members having one end thereof terminally mounted in said first marginal edge of said base portion and extending outwardly therefrom, each of said rod members having a fiber containing notch at the unmounted terminal end thereof, and an elongate weaving wand having a lateral cross-section less than the space between adjacent rod members adapted to feed a fiber from one end and to selectively dispose a weft fiber around, over or under an elongate rod member when positioned such that the longitudinal axis of the weaving wand is substantially parallel to the longitudinal axis of the elongate rod member.

2. An elongate weaving apparatus for individually manipulable single fiber fabrication of woven fabrics as set forth in claim 1, wherein the first and second rows of longitudinally spaced lugs extend perpendicularly above the surface of said base portion and at right angles to the rod containing plane.

3. Weaving apparatus for individually manipulable single fiber fabrication of woven fabrics as set forth in claim 1, wherein the elongate rod members are disposed in parallel spaced relation with each other.

4. Weaving apparatus for individually manipulable single fiber fabrication of woven fabrics as set forth in claim 1, wherein the elongate rod members are uniformly spaced relative to each other.

5. Weaving apparatus for individually manipulable single fiber fabrication of woven fabrics as set forth in claim 1, wherein a plurality of slots in coaxial aligned relation with the rods are disposed in the remote second spaced marginal edge of the base portion *to* prevent entanglement of the multiple warp fibers.

6. Weaving apparatus for individually manipulable single fiber fabrication of woven fabrics as set forth in claim 1, wherein the base portion is a rectangular planar plate.

7. Weaving apparatus for individually manipulable single fiber fabrication of woven fabrics as set forth in claim 1, wherein the base portion is of cylindrical configuration.

8. Weaving apparatus for individually manipulable single fiber fabrication of woven fabrics as set forth in claim 1, wherein the elongate weaving wand comprises an elongate tube with head for frictional engagement of fiber for deposition on the weaving holding frame.

9. Weaving apparatus for individually manipulable single fiber fabrication of woven fabrics as set forth in claim 1, wherein the elongate weaving wand comprises an elongate hollow tube with adjustable head for frictional engagement of fiber for disposition on the weaving holding frame.

10. In an individually manipulable single fiber weaving system that employs a plurality of spaced elongate rods terminally mounted on a base plate the steps of positioning fiber in longitudinally abutting relationship with the elongate rods;

providing an elongate weaving wand having a lateral cross section less than the space between adjacent rods and adapted to feed a fiber from one end;

positioning the elongate weaving wand such that the longitudinal axis of the weaving wand is substantially parallel to the longitudinal axes of the rods;

feeding a fiber from the one end of the elongate weaving wand; and disposing the fiber transverse the rods in over and under sequence.

*11. Weaving apparatus for individually manipulable single fiber fabrication of woven fabrics comprising:*

*a weaving holding frame having*

*a plate like base portion having first and second spaced marginal edges,*

*means extending above the surface of said base portion for receiving a fiber,*

*a plurality of elongate rod members having one end thereof terminally mounted in said first marginal edge of said base portion and extending outwardly therefrom, each of said rod members having a fiber containing notch at the unmounted terminal end thereof, and*

*an elongate weaving wand having a lateral cross-section less than the space between adjacent rod members adapted to feed a fiber from one end and to selectively dispose a weft fiber around, over or under an elongate rod member when positioned such that the longitudinal axis of the weaving wand is substantially parallel to the longitudinal axis of the elongate rod member.*

* * * * *